April 18, 1939. B. C. PLACE 2,154,993
FASTENER
Filed Oct. 30, 1935
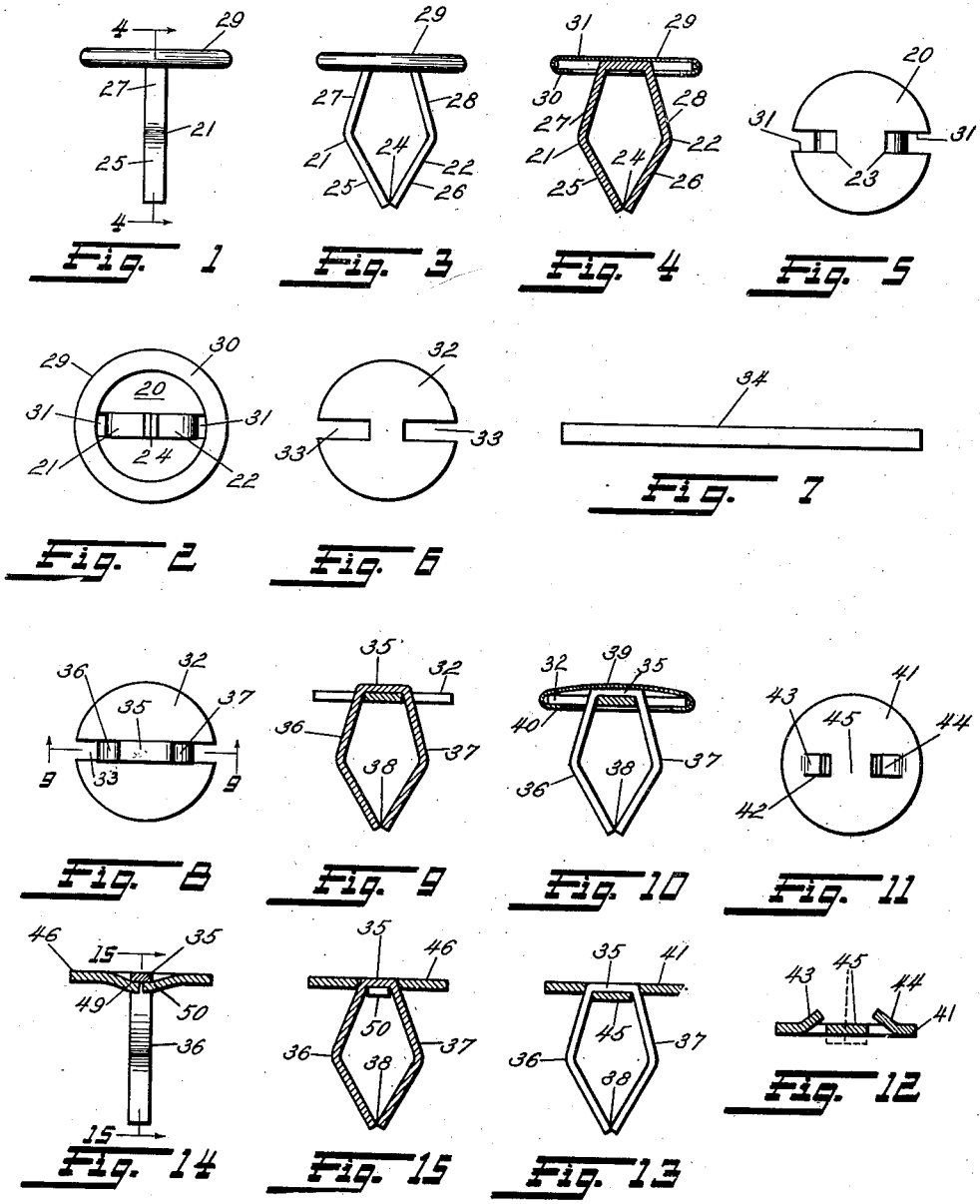
Inventor
Bion C. Place
By Strauch & Hoffman
Attorneys Patented Apr. 18, 1939

2,154,993

UNITED STATES PATENT OFFICE 2,154,993

FASTENER

Bion C. Place, Detroit, Mich., assignor of one-half to George E. Gagnier, Detroit, Mich.

Application October 30, 1935, Serial No. 47,489

2 Claims. (Cl. 24—213)

This invention relates to a new and improved spring stud fastener. More particularly, the invention relates to a sheet metal fastener which may be constructed at low cost and yet provides satisfactory holding power even when used to removably attach relatively heavy trim material, such as upholstered trim panels, to a metallic or like supporting structure.

The principal object of the present invention is to provide a sheet metal fastener having a high degree of stiffness and holding power without constructing the fastener so that parts thereof are subjected to torsion in order to provide them with the ability to sustain relatively heavy parts.

Another object of the invention is to provide a sheet metal spring fastener of the type in which the shank consists only of two legs in which the legs are disposed directly opposite each other so that each leg functions to stiffen and assist the other leg in its holding position.

Still another object of the invention consists in the provision of a sheet metal spring fastener that may be conveniently constructed from two kinds of material, the resilient part from a high grade material and the non-resilient part from a cheaper material.

A still further object of the invention consists in providing an improved two-part spring fastener having the several parts united in a simple manner that permits the production of the fasteners at a low cost.

A still further object of the invention is to produce a spring stud fastener constructed in several parts and presenting a substantially solid disk-like head of small thickness and presenting no projections from either side other than the shank to the end that the head will present the minimum protrusion above any material which it holds by engagement of the outer surface thereof.

Further objects of the invention will appear as a description thereof proceeds with reference to the accompanying drawing in which:

Figure 1 is a side view of a preferred form of fastener of the present invention.

Figure 2 is a view looking along the shank of said fastener toward the head.

Figure 3 is a side view of the fastener of Figure 1.

Figure 4 is a sectional view taken on the plane indicated by the line 4—4 in Figure 1.

Figure 5 is a view looking at the head of the fastener of Figure 1, the cap for said head which is included in the latter figure being removed.

Figures 6 and 7 are views of pieces of material from which a modified form of fastener illustrated in Figures 8 and 9 may be constructed.

Figure 8 is a top view of the fastener constructed from the parts shown in Figures 6 and 7.

Figure 9 is a sectional view taken in a plane 9—9 of Figure 8.

Figure 10 is a sectional view showing a modified form of fastener of Figure 9 including a sheet metal cap for the head.

Figures 11 and 12 are respectively plan and sectional views of a modified form of fastener head constructed as a separate unit.

Figure 13 is a sectional view showing a fastener constructed from the head of Figures 11 and 12.

Figures 14 and 15 are sectional views of a further modified form of fastener taken on planes at right angles to each other.

Figure 16 is a plan view of the head forming a part of Figures 14 and 15.

Like reference characters indicate like parts throughout the several figures.

Referring to the form of the invention illustrated in Figures 1 to 5 of the drawing, the fastener comprises two parts, a fastener proper and a sheet metal cap preferably applied to the head thereof. The fastener proper is preferably constructed from a blank stamped or punched from sheet metal and comprises a head 20 preferably circular in outline, though said head may assume any desired form.

The fastener proper further includes a pair of legs 21 and 22, bent out of the plane of the head 20 on lines 23, Figure 5. The legs 21 and 22 are outwardly bowed and are in contact at 24. The outward bowing of the legs provides guiding surfaces 25 and 26 that diverge from the end of the shank of the fastener and holding surfaces 27 and 28 that converge from the point of maximum outward bowing to the head of the fastener. A sheet metal cap 29 having the edges 30 crimped or bent around the head 20 of the fastener proper completes the disk-like head of the fastener, said sheet metal cap serving to conceal the slots 31 in the head of the fastener proper as illustrated in Figure 2. When a fastener is needed, the head of which is not exposed when it is in use, the sheet metal cap may be dispensed with if desired. When the cap is omitted, it will be understood that the head of the fastener is extremely thin and presents a minimum of protuberance above the surface of any material held in place by the fastener.

It will be observed in the fastener just described that since the legs 21 and 22 contact with each other at the end of the shank, each leg serves to support the companion leg when the shank of the fastener is contracted in passing it through an aperture having a diameter substantially less than the distance across the legs measured at the point of maximum outward bowing. Accordingly when the shank of the fastener is entered in its aperture in a metallic or similar supporting structure in a manner now well understood in the art, the shank elongates as it is passed through said aperture or opening when the legs are straightened to diminish the distance measured across the point of maximum outward bowing necessary to permit the shank of the fastener to be passed through said aperture or opening. As soon as the fastener has been entered in the opening, the legs tend to resume their original position, providing the necessary holding power, since the fastener cannot be withdrawn from the opening without again causing a straightening of both legs constituting the shank in opposition to their inherent tendency to remain in their bowed condition. The fastener proper is constructed of sheet steel and fabricated in the form shown in the drawing, and then subjected to tempering operations that give the fastener proper a relatively high degree of stiffness and resilience. In the fastener just described it will be understood therefore that a superior holding power is obtained over what might be obtained if reliance was placed solely upon the resistance to the bending of the legs on the line 23 as in Patent No. 1,976,889 granted October 16, 1934. The fastener of the present invention can accordingly be constructed of thinner and less expensive material without impairing its holding power or the practicability thereof to maintain a relatively heavy trim material such as the upholstery trim panels of automobile bodies in position.

Instead of constructing the fastener proper from a single blank of sheet metal of a quality capable of being tempered to provide the necessary stiffness and resilience, the fastener of this invention may be constructed from several pieces of material illustrated in Figures 6 and 7 of the drawing. Figure 6 illustrates a separate head for said fastener consisting of a disk 32 provided with kerfs or notches 33 stamped or punched from ordinary sheet metal in the form illustrated in this figure. Inasmuch as the head of the fastener is not required to have any inherent stiffness and resilience the part illustrated in Figure 6 may be punched from inexpensive sheet metal.

To complete a two-part fastener, that is the functional equivalent of the fastener proper illustrated in Figures 1 to 5 of the drawing, a strip of spring steel 34 of uniform width from end to end and illustrated in Figure 7 is associated with the head of Figure 6 in the manner illustrated in Figures 8 and 9.

Preferably before association of the part 34 with the head part 32, the former is bent to provide a portion 35 and two outwardly bowed legs 36 and 37 which contact with each other at the ends of the legs at 38 as illustrated in Figure 9. After the blank of Figure 7 has assumed the form just described, the material is properly tempered and associated with the head 32 by spreading the legs and passing them through the slots 33 in the head 32 until the portion 35 laps the portion of the head between the two slots 33. The portion 35 may be welded or soldered to the portion of the head that is overlapped to bring about a unitary connection between the head part 32 and the tempered sheet steel strip which forms the shank of the fastener.

Instead of securing the sheet steel strip to the head part as just stated, said strip may be held in assembled relation to the head part 32 by using a sheet metal cap 39, in the manner illustrated in Figure 10. As shown in this figure, the edge 40 of the cap 39 is crimped or bent around the edge of the head part 32 clamping the portion 35 of the shank part between the cap 39 and the head part 32. In this form of the invention the cap 39 not only serves to provide a finished appearance for the head of the fastener, but it also serves to secure the shank of the fastener to the head.

The fastener just described is the functional equivalent of the fastener illustrated in Figures 1 to 5 and is used in the manner above described with reference to the fastener of the latter figures.

Another fastener which is the structural and functional equivalent of the fastener of Figures 1 to 5 may be constructed and assembled in the manner illustrated in Figures 11, 12 and 13 of the drawing. In this form of the invention, a disk 41 having an uninterrupted periphery is used to form the head of the fastener. The disk is stamped from ordinary sheet metal. The disk is provided with U-shaped cuts 42, said cuts serving to separate tongues 43 and 44 from the body of the disk. The tongues 43 and 44 are preferably bent upwardly out of the plane of the blank during the operation of stamping the disk from a sheet of metal as illustrated in Figure 12 of the drawing. The shank for association with the head 41 is constructed from a strip of steel of uniform width as illustrated in Figure 7 and bent into the form illustrated in Figures 8 and 9. In assembling the shank part with the head part the legs 36 and 37 are separated and passed through the openings of the head provided by the upward bending of the tongues 43 and 44. The part 35 of the shank part of the fastener is then brought into contact with the narrow band of metal 45 that separates the U-shaped cuts 42. After the shank part has been assembled with respect to the head part in the manner just stated the head of the fastener is subjected to pressure by means of dies or the like to return the tongues 43 and 44 to their original position in the plane of the blank. At the same time the band 45 is depressed out of the plane of the blank to the dotted line position indicated in Figure 12, so that the portion 35 is disposed in the plane of the head in the manner illustrated in Figure 13. A fastener is thus produced having a head that presents a perfectly flat exterior surface of solid disk-like form.

Another preferred way of constructing a two-part fastener including the present invention is illustrated in Figures 14, 15 and 16 in which a disk-like head of a slightly different form is used. In this form of the invention the head part comprises a disk 46 provided in the central portion thereof with a pair of openings 47 and 48. Tongues 49 and 50 are also separated from the body of the disk by parallel cuts and by a transverse cut 51. The head part just described may be secured to a shank part constructed from a strip of spring steel of uniform width bent in the manner previously described by bending the tongues 49 and 50 inwardly so that the shank part can be inserted between them and brought into the openings 47 and 48. Tongues 49 and 50 are then brought under the portions 35 retaining the shank part in assembled relation with respect to the head part. The fastener just described likewise provides a substantially solid disk-like head having an uninterrupted periphery.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A spring stud fastener, comprising a sheet metal disc-like head having a pair of notches therein, a narrow strip of sheet metal of uniform width lapping said head between said notches, and having its ends arranged to depend from said head through said notches, forming two legs which constitute the shank of the fastener, each of said legs being outwarly bowed and arranged directly opposite the other leg, the ends of the legs being in contact.

2. A spring stud fastener, comprising a sheet metal disc-like head having a pair of notches therein, a narrow strip of sheet metal lapping the portion of said head between said notches, and a cap crimped on said head and covering and securing said strip thereto, said strip having its ends arranged to depend from the side of said head opposite to that lapped by said strip to form a pair of legs constituting the shank of the fastener, said legs contacting at the end of the shank and being outwardly bowed between said end and said head.

BION C. PLACE.